United States Patent
Schaepperle et al.

(10) Patent No.: US 7,907,588 B2
(45) Date of Patent: Mar. 15, 2011

(54) METHOD OF REDUCING A PEAK TO AVERAGE POWER RATIO OF A MODULATED SIGNAL

(75) Inventors: Joerg Schaepperle, Stuttgart (DE); Jurgen Otterbach, Stuttgart (DE)

(73) Assignee: Alcatel Lucent, Paris (FR)

( * ) Notice: Subject to any disclaimer, the term of this patent is extended or adjusted under 35 U.S.C. 154(b) by 1028 days.

(21) Appl. No.: 11/679,139

(22) Filed: Feb. 26, 2007

(65) Prior Publication Data
US 2007/0237247 A1   Oct. 11, 2007

(30) Foreign Application Priority Data
Apr. 6, 2006  (EP) ...................................... 06290615

(51) Int. Cl.
*H04B 7/208* (2006.01)
(52) U.S. Cl. ....................................... 370/344; 375/260
(58) Field of Classification Search .......................... None
See application file for complete search history.

(56) References Cited

U.S. PATENT DOCUMENTS
7,417,557 B2 * 8/2008 Osterloh et al. .......... 340/870.03
2006/0280142 A1 * 12/2006 Damnjanovic et al. ....... 370/329

FOREIGN PATENT DOCUMENTS
EP    1571796 A2    9/2005
* cited by examiner

*Primary Examiner* — Phuoc Doan
(74) *Attorney, Agent, or Firm* — Fay Sharpe LLP

(57) ABSTRACT

The invention relates to a method of reducing a peak to average power ratio of a signal, wherein the signal comprises data that is designated for transmission to a sector of a plurality of sectors, and wherein the method comprises the steps of selecting a first subset of radio resources from a given set of radio resources and of assigning a subset of radio resources from the remaining set of radio resource to each sector of said plurality of sectors. Each subset of radio resources is at least approximately disjoint from another subset of radio resources. The method in accordance with the invention further comprises the step of generating the signal by combining the data on the subset of radio resources that has been assigned previously to the sector and by employing said first subset of radio resources for a reduction of the peak to average power ratio. In another aspect the invention relates to a communication network component, to a computer program product and to a wireless communication system.

19 Claims, 4 Drawing Sheets

METHOD OF REDUCING A PEAK TO AVERAGE POWER RATIO OF A MODULATED SIGNAL The invention is based on a priority application EP 06290615.1 which is hereby incorporated by reference.

TECHNICAL FIELD

The invention relates to a method of reducing a peak to average power ratio of a modulated signal designated for transmission to a sector of a plurality of sectors in general.

BACKGROUND OF THE INVENTION

Modulation techniques are commonly employed for transmitting signals in various communication systems. For example, orthogonal frequency division multiplexing (OFDM) has found its way to the high-speed wireless and mobile communication arena. It has been standardized for digital audio broadcast (DAB) in Europe, enabling the mobile reception of high-quality digital audio combined with data services. OFDM has also been adopted for wireless metropolitan and local area networks (WMANs and WLANs) to satisfy the high bit rate requirements of multimedia services and is officially included in the IEEE 802.11 and the IEEE 802.16 (WIMAX) standard.

In an OFDM system, the data is split into N streams, which are independently modulated on parallel closely spaced carrier frequencies or tones. In the applications mentioned above, typically 256 or more tones are used. Practical implementations use an Inverse Fast Fourier Transform (IFFT) to generate a sampled version of the composite time signal. The most distinct advantage of OFDM over single carrier modulation techniques is the easy mitigation of inter-symbol interference and fading, without having to resort to elaborate equalization.

However, high amplitude peaks occur in the composite time signal, when the signals from the different tones add constructively. Compared to the average signal power, the instantaneous power of these peaks is high, and consequently so is the peak to average power ratio. The occurrence of these peaks seriously hampers practical implementations due to for example peak power limitations in the signal processing chain and is generally considered as one of the major drawbacks of the employment of modulation techniques such as OFDM.

There is therefore a need for an improved method of reducing the peak to average power ratio of the composite time signal, for an improved wireless communication system, for a communication network component and for a computer program product comprising computer executable instructions for reducing the peak to average power ratio of the signal.

SUMMARY OF THE INVENTION

In accordance with an embodiment of the invention, there is provided a method of reducing a peak to average power ratio of a signal that is designated for transmission to a sector of a plurality of sectors, wherein the method comprises the step of selecting a first subset of radio resources from a given set of radio resources. The method in accordance with the invention further comprises the step of assigning a subset of radio resources from the remaining set of radio resources to each sector of the plurality of sectors, wherein a subset of radio resources which is assigned to a sector is at least approximately disjoint from a subset that is assigned to another sector of said plurality of sectors, and the step of generating the signal by combining data with the subset of radio resources that has been assigned to the sector and by employing the first subset of radio resources for peak to average power ratio reduction, wherein the data is designated for transmission to the sector.

The term sector refers in the context of this document to a geographic area in general. Furthermore, the term sector refers to a part or a subunit of a cell of a wireless communication network in particular. For example, a cell in a wireless communication network is a geographic area or region that is served by a base station. A base station comprises usually several transceivers. Each transceiver is mounted to the base station in a way so that it is able to serve a part of the cell. The cell is thus sectorized since different transceivers of the same base station serve different parts of the cell.

The first subset of radio resources is used for a reduction of the peak-to-average power ratio along with all subsets of radio resources. The subsets of radio resources that are assigned to the various sectors are disjoint or at least approximately disjoint from each other. Furthermore, the first subset of radio resources is also at least approximately disjoint from all other subsets of radio resources.

In accordance with an embodiment of the invention, a first auxiliary signal is generated by combining the data with the subset of radio resources assigned to the sector. A second auxiliary signal is generated by combining the first subset of radio resources with auxiliary data. The signal is finally generated by a superposition of the first auxiliary signal and the second auxiliary signal, whereby the auxiliary data has been determined so that the peak to average power ratio of the signal is reduced or compensated with respect to the peak to average power ratio of the first auxiliary signal.

In accordance with an embodiment of the invention, a first auxiliary signal is generated by modulating the subset of radio resources assigned to the sector with the data, wherein a second auxiliary signal is generated by modulating the first subset of radio resources with auxiliary data, and wherein the signal is generated by adding the first auxiliary signal and the second auxiliary signal, wherein the auxiliary data are chosen so that the peak-to-average power ratio of the signal is reduced relative to the peak-to-average power ratio of the first auxiliary signal. The data is thus combined with the subset of radio resources by modulating the data on the subset of radio resources.

The data are modulated on the subset of radio resources that has been assigned previously to the sector to which the data is destined to be transmitted, whereby the first auxiliary signal is generated. The second auxiliary signal is generated by modulating auxiliary data on the first subset of radio resources. The signal that is transmitted to the sector corresponds to the superposition of the first auxiliary signal and the second auxiliary signal. The auxiliary data have been chosen in a way that the peak-to-average power ratio of the signal is reduced with respect to the peak-to-average power ratio of the first auxiliary signal. The theoretically optimal value for the peak to average power ratio of the signal is one. In practice, a peak to average power ratio that lies in the range between the peak-to-average power ratio of the first auxiliary signal and one is achieved for the signal.

As mentioned, a first subset of radio resources is selected from the given set of radio resources and is employed for a reduction of the peak to average power ratio of all signals to be transmitted. In principle, a part of each subset of radio resources could be used for a reduction of the peak to average power ratio of signals that are generated by use of the corresponding subset of radio resources. However, the selection of a first subset of radio resources which is then employed for a peak to average power ratio of all signals that are to be transmitted leads typically to a reduction in the number of radio resources that are reserved for a peak to average power ratio reduction. Hence, more radio resources are available for the delivery of data. Thus the spectral efficiency and the range of the broadband wireless access system employing the method in accordance with the invention is enhanced.

In accordance with an embodiment of the invention, the method further comprises the step of sending the signal to the sector. It is generally not possible to sharply separate adjacent sectors from each other. A signal that is sent to a sector might thus also be detectable in an adjacent sector. As mentioned before, the various subsets of radio resources are at least approximately disjoint from each other. The first subset of radio resources is however shared by all subsets of radio resources for a reduction of the peak to average power ratio of signals to be transmitted. The superposition of the signals in the air, e.g. the superposition of a signal sent to a sector with a signal sent to an adjacent sector, will have no negative consequence, since the first subset of radio resources is not used for transporting useful data and is therefore not decoded at the receiver.

In accordance with an embodiment of the invention, the data is modulated on the subset of radio resources by use of orthogonal frequency division multiplexing (OFDM) and the first subset of radio resources is employed for a reduction of the peak to average power ratio of the generated signal.

In accordance with an embodiment of the invention, the method in accordance with the invention is employed by a single base station, wherein the base station is serving each sector of the plurality of sectors. The term sector refers in this context to a subunit of a cell of a wireless communication network. The plurality of sectors constitute then the cell that is served by the base station.

In accordance with an embodiment of the invention, the plurality of sectors relate to a plurality of cells of a wireless communication network, wherein each cell of the plurality of cells is served by a base station and each base station employs the first subset of radio resources for a reduction of the peak to average power ratio of the transmitted signals. A subset of the remaining radio resources is assigned to each sector of the plurality of sectors, whereof the various subsets are at least approximately disjoint from each other. The subset of radio resources which has been previously assigned to a sector is used as a carrier for data to be transmitted to the sector. The first subset of radio resources is shared by all subsets of radio resources which have been selected from the remaining set of radio resources and is furthermore used by more than one base station in order to reduce the peak to average power ratio of the signals to be transmitted. The superposition of the signals on these sub-carriers in the air will have no negative consequence, since the first subset of radio resources is not used for transporting useful data and is therefore not decoded at the receiver.

In accordance with an embodiment of the invention, the plurality of cells are contiguous.

In accordance with an embodiment of the invention, the given set of radio resources is a set of at least approximately orthogonal sub-carrier signals.

In accordance with an embodiment of the invention, the given set of radio resources relates to a given set of codes as employed by the code division multiple access (CDMA) technique. The first subset of radio resources relates then to a first subset of codes and each subset of radio resources relates to a subset of codes. The subsets of codes are at least approximately disjoint from each other which means that the subsets of codes are orthogonal or at least approximately orthogonal with respect to each other. A first auxiliary signal is generated by modulating data which has been spread with the codes of the subset of codes on a carrier signal, whereby the subset of codes has been assigned previously to the sector to which the data shall be transmitted. A second auxiliary signal is generated by modulating auxiliary data that have been spread with the codes of the first subset of codes on the carrier signal. The signal is generated by adding the first auxiliary signal and the second auxiliary signal, whereby the auxiliary data has been chosen so that the peak to average power ratio of the signal is reduced with respect to the peak to average power ratio of the first auxiliary signal.

Each code comprised in a subset of codes can be represented by a code function $g_{i,j}(t)$, which is a function of the time t. The index i is used in order to indicate that the code function $g_{i,j}(t)$ is an element of the subset of codes which has been assigned to sector i, with i=1, 2, ..., N (for the following, it is assumed that there are N sectors). The index j is used to distinguish the code functions of each subset of codes from each other. Let the index j be in the range between 1 and M. Thus, j=1, 2, ..., M. There are thus M different code functions in a subset of codes, whereby each code function relates to a code. Typically, M varies from one subset of codes to another subset of codes. Thus, M is a function of i: M=M(i).

The index i=0 is used to indicate the code functions $g_{0,j}(t)$ relating to the codes j=1, 2, ..., M(i=0) of the first subset of codes (there are thus M(i=0) codes in the first subset of codes, with M(i=0)>=1). For convenience, M(i=0) is taken to be equal to P; M(i=0)=P.

The time signals corresponding to the data to be transmitted can be written as $d_{i,j}(t)$, wherein i=1, 2, ..., N and j=1, 2, ..., M(i) as has been the case above.

When the data is supposed to be transmitted to the sector with i=k, then the "coded" signal $s_k(t)=d_{k,1}(t) g_{k,1}(t) + \ldots + d_{k,M}(t) g_{k,M}(t)$ is generated. The first auxiliary signal is then generated by a modulation of the "coded" signal $s_k(t)$ on a given carrier signal.

This first auxiliary signal could be transmitted directly to the sector k since the data is comprised in the first auxiliary signal. However in order to achieve a reduction of the peak to average ratio of the first auxiliary signal, a second auxiliary signal is generated that is added to the first auxiliary signal.

Auxiliary data is represented by the time signals $a_{0,j}(t)$ with j=1, 2, ..., P. A "coded" auxiliary data signal $r_k(t)=a_{0,1}(t) g_{0,1}(t) + \ldots + a_{0,P}(t) g_{0,P}(t)$ is then generated. The "coded" auxiliary data signal $r_k(t)$ is then modulated on the carrier signal, whereby the second auxiliary signal is produced.

The signal that is finally transmitted is then generated by a superposition of the first auxiliary signal and the second auxiliary signal.

In accordance with an embodiment of the invention, a first auxiliary signal is generated by spreading data with the codes of the subset of codes assigned to the sector to which the data shall be sent. A second auxiliary signal is generated by spreading auxiliary data with the codes of the first subset of codes. The signal is generated by adding the first auxiliary signal and the second auxiliary signal, whereby the auxiliary data has been chosen so that the peak to average power ratio of the signal is reduced with respect to the peak to average power ratio of the first auxiliary signal. The signal can then be modulated on a carrier frequency.

In another aspect the invention relates to a communication network component, wherein the communication network component serves a plurality of sectors, and wherein the communication network component comprises means for selecting a first subset of radio resources from a given set of radio resources, means for assigning a subset of radio resources from the remaining set of radio resources to each sector of the plurality of sectors, wherein a subset of radio resources which is assigned to a sector is at least approximately disjoint from a subset that is assigned to another sector of the plurality of sectors, and means for generating a signal by combining data with the subset of radio resources assigned to the sector and by employing the first subset of radio resources for a reduction of the peak to average power ratio of the signal, wherein the data is designated for transmission to the sector.

In accordance with an embodiment of the invention, the communication network component comprises further means for generating a first auxiliary signal by combining the subset of radio resource assigned to the sector with the data, means for generation a second auxiliary signal by combining the first subset of radio resources with auxiliary data, and means for generating the signal by adding the first auxiliary signal and the second auxiliary signal, wherein the auxiliary data is chosen so that the peak-to-average power ratio of the signal is reduced relative to the peak-to-average power ratio of the first auxiliary signal.

In accordance with an embodiment of the invention, the communication network component further comprises means for sending the signal.

In accordance with an embodiment of the invention, the communication network component is an orthogonal frequency division multiplexing (OFDM) base station.

In accordance with an embodiment of the invention, the communication network component is comprised in a communication network. The communication network is also denoted as communication system. The communication network employs for example the IEEE 802.16 (WIMAX) standard, the IEEE 802.11 (WLAN) standard, the DAB standard or the ADSL standard.

In another aspect the invention relates to a computer program product comprising computer executable instructions for reducing a peak to average power ratio of a signal comprising data, the data being designated for transmission to a sector of a plurality of sectors, the instructions being adapted to performing the step of selecting a first subset of radio resources from a given set of radio resources, the step of assigning a subset of radio resources from the remaining set of radio resources to each sector of the plurality of sectors, wherein a subset of radio resources which is assigned to a sector is at least approximately disjoint from a subset that is assigned to another sector of the plurality of sectors, and the step of generating the signal by combining the data with the subset of radio resources assigned to the sector and by employing the first subset of radio resources for a reduction of the peak to average power ratio of the signal.

In another aspect the invention relates to a wireless communication system comprising means for selecting a first subset of radio resources from a given set of radio resources, means for assigning a subset of radio resources from the remaining set of radio resources to each sector of the plurality of sectors, wherein a subset of radio resources which is assigned to a sector is at least approximately disjoint from a subset that is assigned to another sector of the plurality of sectors, means for generating a signal by combining data designated for transmission to a sector of the plurality of sectors with the subset of radio resources assigned to the sector and by employing the first subset of radio resources for peak to average power reduction, and means for sending the signal to the sector.

In accordance with an embodiment of the invention, the wireless communication system comprises a plurality of base stations, wherein each base station serves a specific subset of sectors of the plurality of sectors, and wherein the first subset of radio resources is used for reduction of the peak to average ratio of each signal designated to be sent by one of the base stations.

BRIEF DESCRIPTION OF THE DRAWINGS

In the following preferred embodiments of the invention will be described in greater detail by way of example only, making reference to the drawings in which.

DETAILED DESCRIPTION OF PREFERRED EMBODIMENTS

Figure 1:
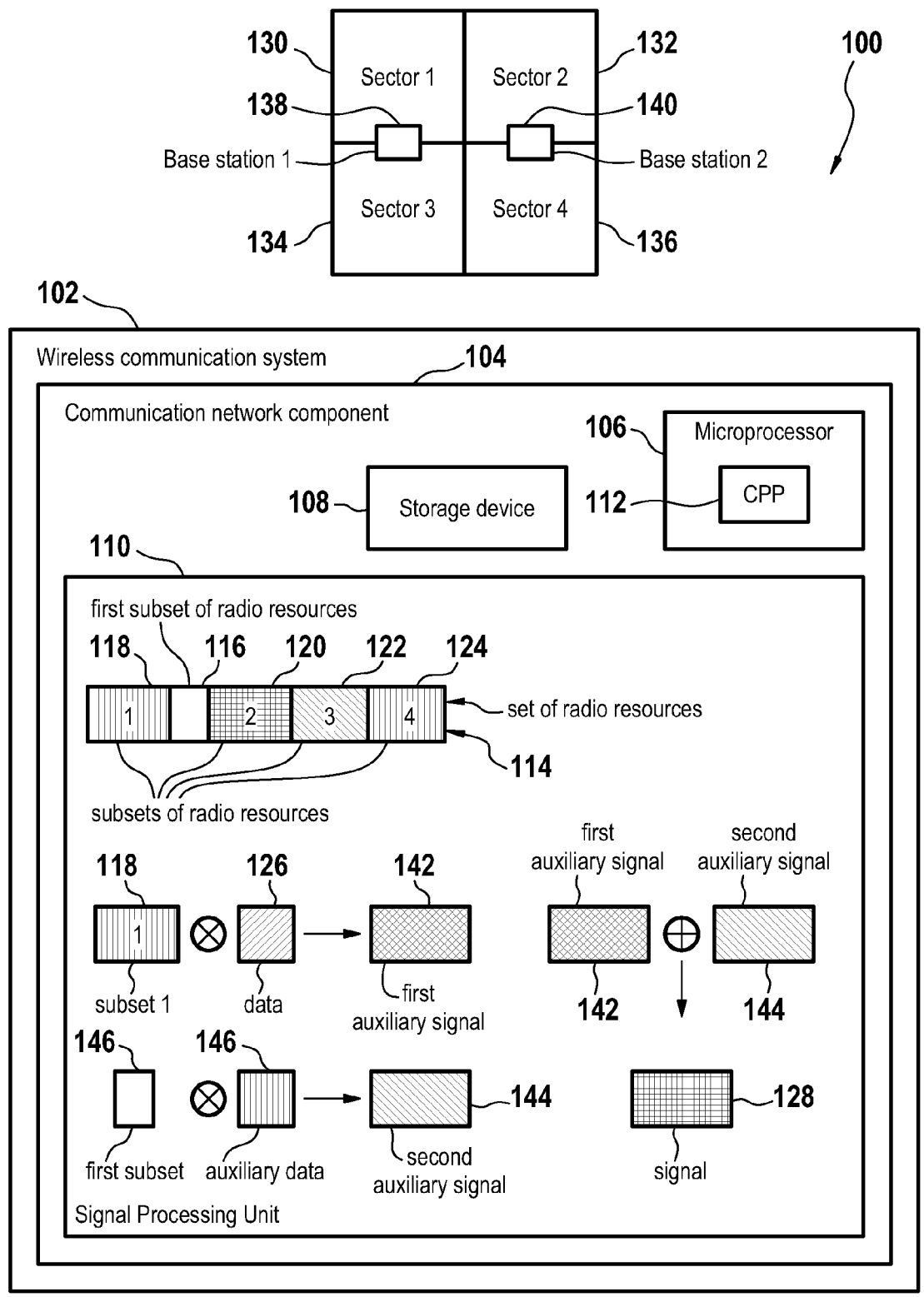
FIG. 1 is a block diagram showing a wireless communication system serving a plurality of sectors.

FIG. 1 is a block diagram 100 showing schematically a wireless communication system 102 serving a plurality of sectors consisting of sector 1 130, sector 2 132, sector 3 134, and sector 4 136, whereby a signal which is designated for sector 1 130 or sector 3 134 is transmitted by base station 1 138, and whereby a signal which is designated for sector 2 132 or sector 4 136 is transmitted by base station 2 140. The base stations 138 and 140 are comprised in the wireless communication systems 102.

The wireless communication system 102 further comprises a communication network component 104. The communication network component 104 comprises a microprocessor 106, a storage device 108, and a signal processing unit 110. The signal processing unit 110 provides a set of radio resources 114.

The microprocessor 106 executes a computer program product 112 which is loaded from the storage device 108 for example during the startup of the communication network component 104. The computer program product 112 comprises computer executable instructions that are adapted to performing the method in accordance with the invention.

In operation, a first subset of radio resources 116 is selected from the set of radio resources 114 that is provided by the signal processing unit 110. Furthermore a subset of radio resources such as subset of radio resources 1 118, subset of radio resources 2 120, subset of radio resources 3 122, and subset of radio resources 4 124, is assigned to each sector of the sectors 130, 132, 134 and 136. The subsets of radio resources 118, 120, 122, and 124 are at least approximately disjoint from each other.

For example, the subset of radio resources 1 118 is assigned to sector 1 130, the subset of radio resources 2 120 is assigned to sector 2 132, the subset of radio resources 3 122 is assigned to sector 3 134, and the subset of radio resources 4 124 is assigned to sector 4 136.

Figure 4:
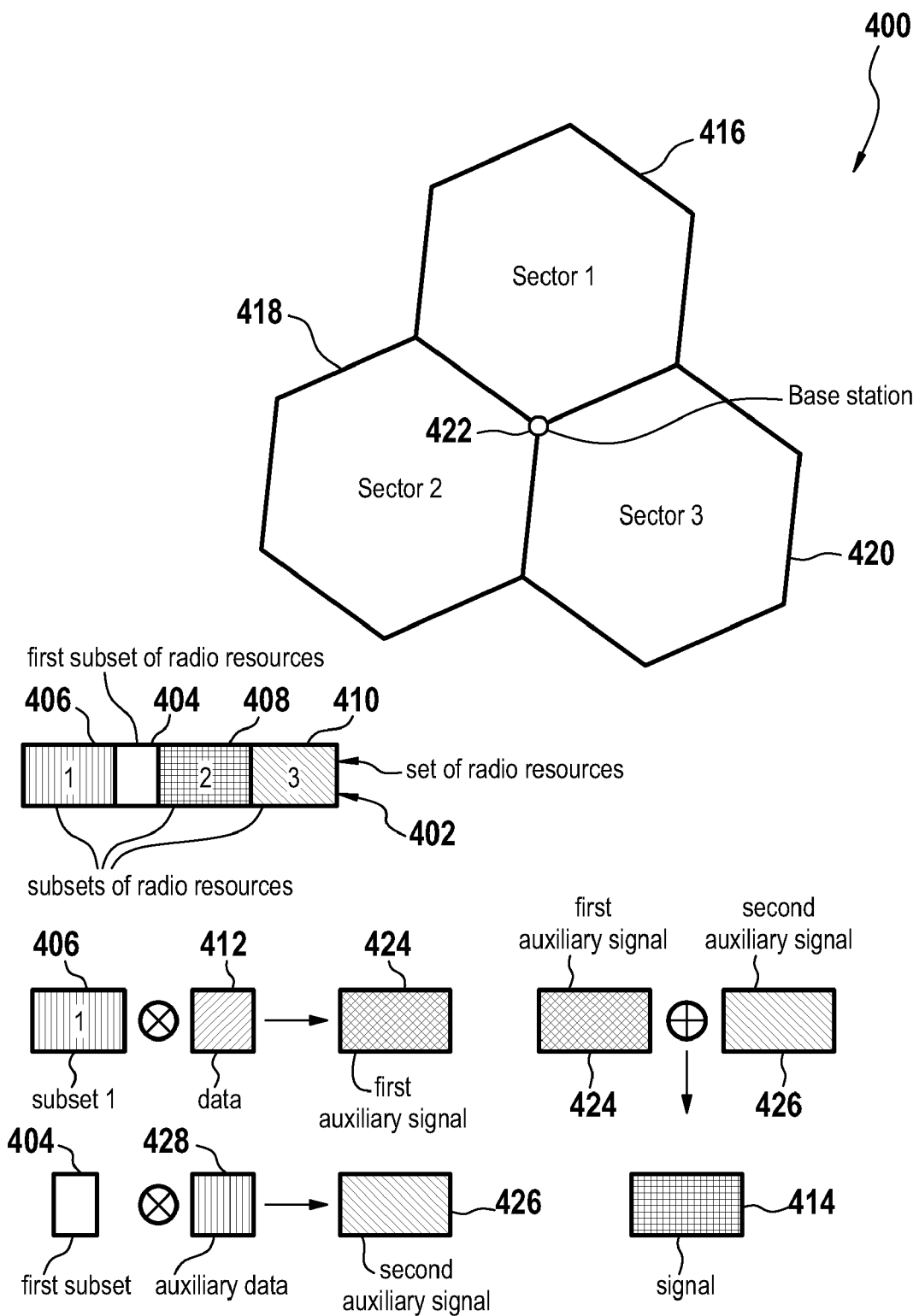
FIG. 4 depicts three sectors that are served by a base station and schematically the generation of a signal designated for one of the three sectors.

If data is destined for transmission to a sector, for example if data 126 shall be transmitted to sector 1 130, then the subset of radio resources 1 118 is modulated with the data 126, whereby a first auxiliary signal 142 is generated. The encircled x in FIG. 1 and also in FIG. 4 is used here in order to symbolize that a subset of radio resources is modulated with data. The first subset of radio resources 116 is employed for a reduction of the peak to average power ratio. The first subset of radio resources 116 is therefore modulated with auxiliary data 146, whereby a second auxiliary signal 144 is generated. The first auxiliary signal 142 and the second auxiliary signal 144 are then superposed with each other, whereby the signal 128 is generated. The encircle plus is used in FIG. 1 as well as in FIG. 4 to indicate the superposition of the first and second auxiliary signal 142 and 144. The first subset of radio resources 116 is modulated with the auxiliary data 146 in a way so that the high peak amplitudes in the signal 128 are reduced or even compensated with respect to the first auxiliary signal 142. The signal 128 is then passed onto the base station 1 138 which transmits the signal to sector 1 130.

If the data 126 shall be transmitted to sector 4, then the data 126 is modulated with the subset of radio resources 4 124, whereby the first subset of radio resources 116 is also employed for a reduction of the peak-to-average power ratio.

A set of radio resources can be a set of closely space carrier frequencies that are commonly employed in OFDM systems. Each subset of radio resources 118, 120, 122, and 124 is at least approximately disjoint from each other. In the example given above each subset consists of a plurality of adjacent sub-carriers but in general the sub-carriers do not have to be adjacent to each other. According to the method in accordance with the invention one common subset of reserved sub-carriers, the first subset of radio resources 116, is shared between all segments and the rest of the sub-carriers is divided into at least approximately disjoint subsets of carriers that are used for the transport of data to the various sectors. The usage of one common subset of reserved sub-carriers for a peak to average power ratio reduction of all signals that are generated by use of any subset of radio resources implies that the carriers used in the sectors 130 to 136 for the transport of data and for reducing the peak to average power ratio are no longer disjoint and that the intersection of the subsets is the set of reserved sub-carriers that are employed for a reduction of the peak to average power ratio. The superposition of the signals that are for example transmitted by base station 1 138 and base station 2 140 in the air will however have no negative consequence, since the first subset of radio resources 116 will not be decoded by a receiver.

Figure 2:
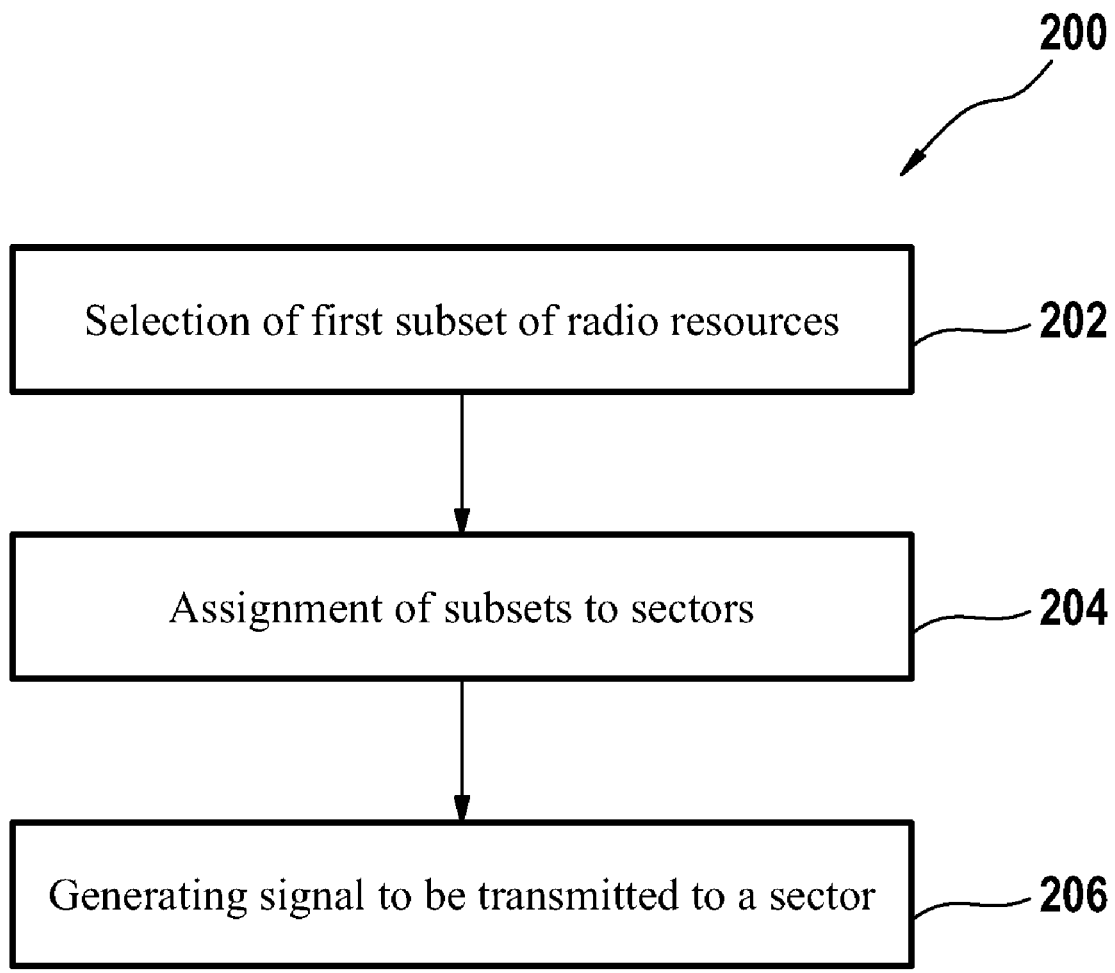
FIG. 2 is a flow diagram depicting the basic steps performed by the method in accordance with the invention.

FIG. 2 shows a flow diagram depicting the basic steps performed by the method in accordance with the invention. In step 202 a first subset of radio resources is selected from a given set of radio resources. In step 204 a subset of radio resources is assigned from the remaining set of radio resources to each sector of a plurality of sectors. A subset of radio resources which is assigned to a sector is at least approximately disjoint from a subset that is assigned to another sector of the plurality of sectors. In step 206 a signal is generated by combining data with the subset of radio resources that has been assigned to a sector and by employing the first subset of radio resources for reduction of the peak to average power ratio of the generated signal, whereby the data are destined for transmission to the sector.

Figure 3A:
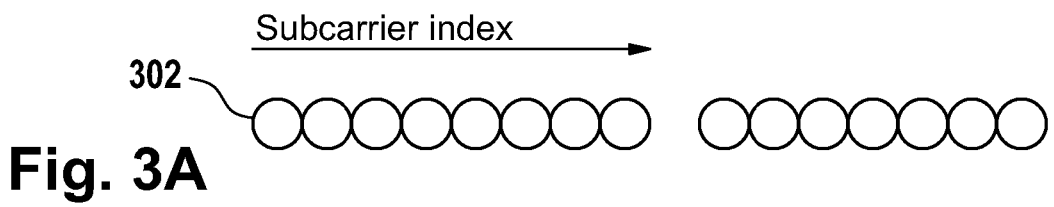
FIG. 3A depicts schematically a set of radio resources.

FIG. 3A depicts schematically a set of radio resources 302 as a line of circles. The set of radio resources 302 consists here of a set of equally spaced sub-carrier frequencies as employed for example in OFDM. Each circle symbolizes one sub-carrier frequency. Each sub-carrier frequency is addressed by a sub-carrier index which increases from left to right as indicated by the arrow. The line of circles is disrupted. The missing circle corresponds to the DC sub-carrier frequency which is not employed for modulation.

Figure 3B:
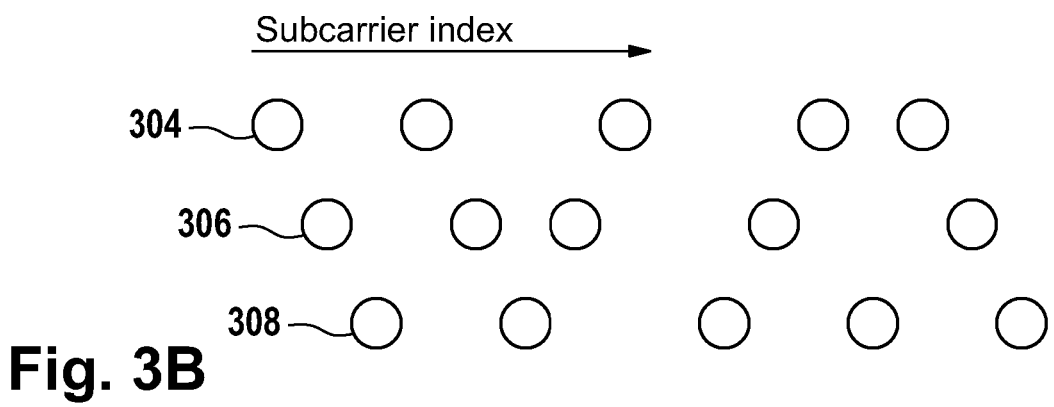
FIG. 3B illustrates how the set of radio resources is divided into various subsets of radio resources.

FIG. 3B illustrates how the set of radio resources 302 can be divided into various subsets of radio resources 304, 306, and 308 that are allocated for transmission of data to different sectors. As can be seen, the subsets of radio resources 304, 306, and 308 do not need to consist of adjacent sub-carrier frequencies.

Figure 3C:
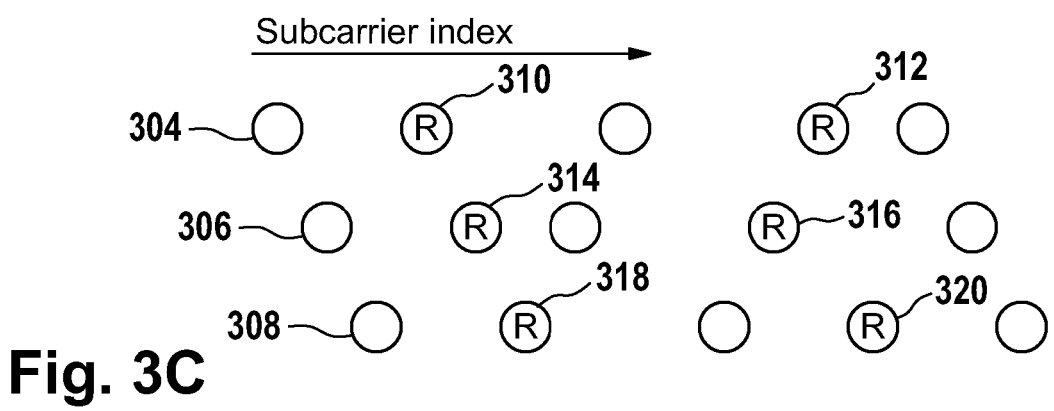
FIG. 3C shows the case in which in each subset of radio resources a certain percentage of the sub-carriers is reserved for reduction of the peak to average power ratio.

FIG. 3C shows the case in which in each subset of radio resources 304, 306, and 308 a certain percentage of the sub-carriers are reserved for reduction of the peak to average power ratio. In the subset of radio resources 304, sub-carrier frequencies 310 and 312 are reserved for peak to average power ratio reduction as indicated by 'R' in the corresponding circles of FIG. 3C. In the subset of radio resources 306, sub-carrier frequencies 314 and 316 are reserved for peak to average power ratio reduction and correspondingly in the subset of radio resources 308, sub-carrier frequencies 318 and 320 are reserved for reducing the peak to average power ratio.

Figure 3D:
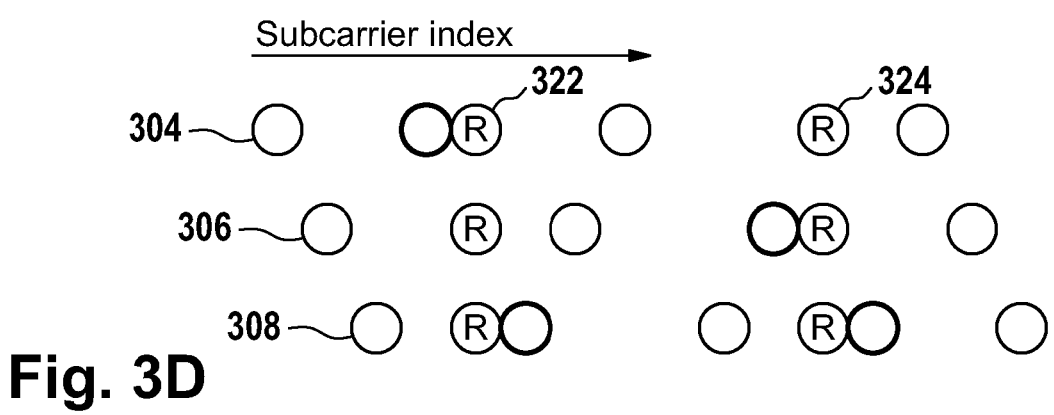
FIG. 3D shows the case in which the same carrier frequencies are allocated for peak to average power ratio reduction for all subsets of radio resources.

FIG. 3D shows the case in which the same carrier frequencies 322 and 324 are allocated for peak to average power ratio reduction for all subsets of radio resources 304, 306 and 308. The sub-carrier frequencies 322 and 324 correspond to the first subset of radio resources. It is obvious from a comparison with FIG. 3C that some of the sub-carrier frequencies that have previously been used for peak to average power ratio reduction are now free for data transport. These are printed with bold lines in FIG. 3D. As a consequence, the amount of usable radio resources increases, which results in higher throughput and better spectral efficiency.

FIG. 4 depicts schematically three sectors 416, 418, 420 of a cell 400 of a fixed or mobile wireless communication system and schematically the generation of a signal designated for one of the three sectors. The three sectors 416, 418 and 420 of the cell 400 are served by a base station 422.

The set of radio resources 402 is divided into various subsets of radio resources 406, 408, and 410 and into a first subset of radio resources 404.

Each subset of radio resources 406, 408, and 410 is assigned to a sector 416, 418, 420. For example the subset of radio resources 406 is assigned to sector 416, the subset of radio resources 408 is assigned to sector 418, and the subset of radio resources 410 is assigned to sector 420.

When data 412 is destined for transmission to a sector, then the corresponding subset of radio resources is used as data carrier and the first subset of radio resources 404 is used for peak-to-average power reduction. Auxiliary data 428 is modulated on the first subset of radio resources 404 so that the peaks in the signal 414 that is transmitted to the sector are compensated or reduced.

For example, if the data 412 shall be transmitted to sector 1 416, then the data 412 is modulated on the subset of radio resources 406, whereby a first auxiliary signal 424 is generated. The first subset of radio resources 404 is modulated with the auxiliary data 428 so that a second auxiliary signal 426 is generated. The signal 414 is then generated by a superposition of the first auxiliary signal 424 and the second auxiliary signal 426. The peak-to-average power ratio of the signal 414 is reduced with respect to the first auxiliary signal 424 which holds the data to be transmitted. The so produced signal 414 is then transmitted by the base station 422 to sector 1 416.

| List of Reference Numerals | |
|---|---|
| 100 | Block diagram |
| 102 | Wireless communication system |
| 104 | Communication network component |
| 106 | Microprocessor |
| 108 | Storage device |
| 110 | Signal processing unit |
| 112 | Computer program product |
| 114 | Set of radio resources |
| 116 | First subset of radio resources |
| 118 | Subset of radio resources 1 |
| 120 | Subset of radio resources 2 |
| 122 | Subset of radio resources 3 |
| 124 | Subset of radio resources 4 |
| 126 | Data |
| 128 | Signal |
| 130 | Sector 1 |
| 132 | Sector 2 |
| 134 | Sector 3 |
| 136 | Sector 4 |
| 138 | Base station 1 |
| 140 | Base station 2 |
| 142 | First auxiliary signal |
| 144 | Second auxiliary signal |
| 146 | Auxiliary data |
| 200 | Flow diagram |
| 302 | Set of radio resources |
| 304 | Subset of radio resources |
| 306 | Subset of radio resources |
| 308 | Subset of radio resources |
| 310 | Sub-carrier frequency |
| 312 | Sub-carrier frequency |
| 314 | Sub-carrier frequency |
| 316 | Sub-carrier frequency |
| 318 | Sub-carrier frequency |
| 320 | Sub-carrier frequency |
| 322 | Sub-carrier frequency |
| 324 | Sub-carrier frequency |
| 400 | Cell |
| 402 | Set of radio resources |
| 404 | First subset of radio resources |
| 406 | Subset of radio resources 1 |
| 408 | Subset of radio resources 2 |
| 410 | Subset of radio resources 3 |
| 412 | Data |
| 414 | Signal |
| 416 | Sector 1 |
| 418 | Sector 2 |
| 420 | Sector 3 |
| 422 | Base station |
| 424 | First auxiliary signal |
| 426 | Second auxiliary signal |
| 428 | Auxiliary data |

The invention claimed is:

1. A method of reducing a peak to average power ratio of a signal, said signal comprising data designated for transmission to a sector of a plurality of sectors, said method comprising:
   selecting a first subset of radio resources from a given set of radio resources, wherein the first subset of radio resources is employable in all sectors of the plurality of sectors for peak to average power reduction; and
   assigning a subset of radio resources from the remaining set of radio resources to each sector of said plurality of sectors;
   wherein a subset of radio resources which is assigned to a sector is at least approximately disjoint from a subset that is assigned to another sector of said plurality of sectors, the method further comprising:
   generating a first auxiliary signal by combining the data with the subset of radio resources assigned to the sector;
   generating a second auxiliary signal by combining the first subset of radio resources with auxiliary data; and
   generating said signal by a superposition of the first auxiliary signal and the second auxiliary signal, wherein the auxiliary data is determined such that the peak to average power ratio of the signal is reduced with respect to the peak to average power ratio of the first auxiliary signal.

2. The method of claim 1, said method further comprising sending said signal to said sector.

3. The method of claim 1, wherein the first auxiliary signal is generated by modulating said subset of radio resources assigned to said sector with said data, wherein the second auxiliary signal is generated by modulating said first subset of radio resources with auxiliary data, and wherein said signal is generated by adding the first auxiliary signal and the second auxiliary signal, said auxiliary data being adapted so that the peak-to-average power ratio of said signal is reduced relative to the peak-to-average power ratio of said first auxiliary signal.

4. The method of claim 1, wherein said data is modulated on said subset of radio resources by use of orthogonal frequency division multiplexing.

5. The method of claim 1, wherein said given set of radio resources corresponds to a set of codes, wherein said first subset of radio resources corresponds to a first subset of codes, wherein each subset of radio resources corresponds to a subset of codes, wherein the subsets of codes are at least approximately disjoint from each other.

6. The method of claim 5, wherein the first auxiliary signal is generated by spreading data with the codes of the subset of codes assigned to the sector to which the data is to be sent, wherein the second auxiliary signal is generated by spreading auxiliary data with the codes of the first subset of codes, and wherein the signal is generated by adding the first auxiliary signal and the second auxiliary signal, whereby the auxiliary data is chosen so that the peak to average power ratio of the signal is reduced with respect to the peak to average power ratio of the first auxiliary signal.

7. A computer program product stored in a non-transitory computer-readable storage device of a network component for reducing a peak to average power ratio of a signal designated for transmission to a sector of a plurality of sectors in a communication network, said computer program product comprising computer executable instructions adapted to cause the network component to perform the following:
   selecting a first subset of radio resources from a given set of radio resources, wherein the first subset of radio resources is employable in all sectors of the plurality of sectors for peak to average power reduction; and
   assigning a subset of radio resources from the remaining set of radio resources to each sector of said plurality of sectors;
   wherein a subset of radio resources which is assigned to a sector is at least approximately disjoint from a subset that is assigned to another sector of said plurality of sectors, the computer executable instructions also adapted to cause the network component to perform the following:
   generating a first auxiliary signal by combining the data with the subset of radio resources assigned to the sector;
   generating a second auxiliary signal by combining the first subset of radio resources with auxiliary data; and
   generating said signal by a superposition of the first auxiliary signal and the second auxiliary signal, wherein the auxiliary data is determined such that the peak to average power ratio of the signal is reduced with respect to the peak to average power ratio of the first auxiliary signal.

8. The computer program product of claim 7, the computer executable instructions also adapted to cause the network component to perform the following:
sending the signal to the sector.

9. The computer program product of claim 7, the computer executable instructions also adapted to cause the network component to perform the following:
modulating the subset of radio resources assigned to the sector with the data to generate the first auxiliary signal;
modulating the first subset of radio resources with auxiliary data to generate the second auxiliary signal; and
adding the first auxiliary signal and the second auxiliary signal to generate the signal, the auxiliary data being adapted so that the peak-to-average power ratio of the signal is reduced relative to the peak-to-average power ratio of the first auxiliary signal.

10. The computer program product of claim 7, the computer executable instructions also adapted to cause the network component to perform the following:
modulating the data on the subset of radio resources using orthogonal frequency division multiplexing.

11. The computer program product of claim 7 wherein the given set of radio resources corresponds to a set of codes, wherein the first subset of radio resources corresponds to a first subset of codes, wherein each subset of radio resources corresponds to a subset of codes, wherein the subsets of codes are at least approximately disjoint from each other.

12. The computer program product of claim 11, the computer executable instructions also adapted to cause the network component to perform the following:
spreading data with the codes of the subset of codes assigned to the sector to which the data is to be sent to generate the first auxiliary signal;
spreading auxiliary data with the codes of the first subset of codes to generate the second auxiliary signal; and
adding the first auxiliary signal and the second auxiliary signal to generate the signal, whereby the auxiliary data is chosen so that the peak to average power ratio of the signal is reduced with respect to the peak to average power ratio of the first auxiliary signal.

13. A communication network component, said communication network component serving a plurality of sectors, said communication network component comprising:
means for selecting a first subset of radio resources from a given set of radio resources, wherein the first subset of radio resources is employable in all sectors of the plurality of sectors for peak to average power reduction; and
means for assigning a subset of radio resources, from the remaining set of radio resources to each sector of said plurality of sectors;
wherein a subset of radio resources which is assigned to a sector is at least approximately disjoint from a subset that is assigned to another sector of said plurality of sectors, the communication network component further comprising:
means for generating a first auxiliary signal by combining the data with the subset of radio resources assigned to the sector;
means for generating a second auxiliary signal by combining the first subset of radio resources with auxiliary data; and
means for generating a signal by a superposition of the first auxiliary signal and the second auxiliary signal, wherein the auxiliary data is determined such that the peak to average power ratio of the signal is reduced with respect to the peak to average power ratio of the first auxiliary signal.

14. A wireless communication system comprising at least one communication network component according to claim 13, and a plurality of base stations, wherein each base station serves a specific subset of sectors of said plurality of sectors, and wherein at least two base stations employ the first subset of radio resources for a reduction of the peak to average power ratio.

15. The communication network component of claim 13, further comprising:
means for sending the signal to the sector.

16. The communication network component of claim 13, further comprising:
means for modulating the subset of radio resources assigned to the sector with the data to generate the first auxiliary signal;
means for modulating the first subset of radio resources with auxiliary data to generate the second auxiliary signal; and
means for adding the first auxiliary signal and the second auxiliary signal to generate the signal, said auxiliary data being adapted so that the peak-to-average power ratio of said signal is reduced relative to the peak-to-average power ratio of said first auxiliary signal.

17. The communication network component of claim 13, further comprising:
means for modulating the data on the subset of radio resources using orthogonal frequency division multiplexing.

18. The communication network component of claim 13 wherein the given set of radio resources corresponds to a set of codes, wherein the first subset of radio resources corresponds to a first subset of codes, wherein each subset of radio resources corresponds to a subset of codes, wherein the subsets of codes are at least approximately disjoint from each other.

19. The communication network component of claim 18, further comprising:
means for spreading data with the codes of the subset of codes assigned to the sector to which the data is to be sent to generate the first auxiliary signal;
means for spreading auxiliary data with the codes of the first subset of codes to generate the second auxiliary signal; and
means for adding the first auxiliary signal and the second auxiliary signal to generate the signal, whereby the auxiliary data is chosen so that the peak to average power ratio of the signal is reduced with respect to the peak to average power ratio of the first auxiliary signal.

* * * * *